(12) United States Patent
Tachikawa et al.

(10) Patent No.: US 8,803,481 B2
(45) Date of Patent: Aug. 12, 2014

(54) BATTERY PACK AND METHOD OF CONTROLLING THE SAME

(75) Inventors: Takashi Tachikawa, Fukushima (JP); Masaki Hogari, Fukushima (JP); Kiyohiko Watanabe, Fukushima (JP)

(73) Assignee: Sony Corporation, Tokyo (JP)

( * ) Notice: Subject to any disclaimer, the term of this patent is extended or adjusted under 35 U.S.C. 154(b) by 460 days.

(21) Appl. No.: 12/683,214

(22) Filed: Jan. 6, 2010

(65) Prior Publication Data
US 2010/0176764 A1    Jul. 15, 2010

(30) Foreign Application Priority Data

Jan. 13, 2009   (JP) ................... P2009-004207

(51) Int. Cl.
*H02J 7/00* (2006.01)
(52) U.S. Cl.
USPC .................. 320/134; 320/135; 320/136
(58) Field of Classification Search
USPC .................................. 320/134–136
See application file for complete search history.

(56) References Cited

U.S. PATENT DOCUMENTS

| | | | | |
|---|---|---|---|---|
| 5,808,446 A | * | 9/1998 | Eguchi | 320/134 |
| 6,501,248 B2 | * | 12/2002 | Fujiwara | 320/136 |
| 7,728,556 B2 | * | 6/2010 | Yano et al. | 320/134 |
| 7,923,968 B2 | * | 4/2011 | Sano et al. | 320/134 |
| 2001/0026147 A1 | * | 10/2001 | Nakashimo | 320/134 |
| 2004/0004458 A1 | * | 1/2004 | Tanaka et al. | 320/106 |
| 2005/0285572 A1 | * | 12/2005 | Geren et al. | 320/134 |
| 2008/0055808 A1 | * | 3/2008 | Burkland et al. | 361/94 |

FOREIGN PATENT DOCUMENTS

| | | |
|---|---|---|
| JP | HEI 09-019053 | 1/1997 |
| JP | 2000-067928 | 3/2000 |
| JP | 2004-120849 | 4/2004 |
| JP | 2005-312140 | 11/2005 |
| JP | 2006-210252 | 8/2006 |
| JP | 2008-062343 | 3/2008 |
| JP | 2008-178278 | 7/2008 |

OTHER PUBLICATIONS

Japanese Office Action issued Nov. 2, 1010, for corresponding Japanese Appln. No. 2009-004207.

* cited by examiner

*Primary Examiner* — Samuel Berhanu
(74) *Attorney, Agent, or Firm* — K&L Gates LLP

(57) ABSTRACT

A battery pack for an electrically powered tool includes: one or plural secondary batteries connected in series and/or in parallel; a current detection resistor in a current path through which a charge/discharge current flows into each secondary battery; an N-channel charge control FET and an N-channel discharge control FET in the current path so as to control the charge/discharge current; and a controller detecting the charge/discharge current flowing in the current detection resistor and controlling the charge and discharge control FETs based on the detection result. A threshold value indicating an overcurrent detection current with respect to the charge/discharge current is set in advance, and the controller compares the charge/discharge current detected by the current detection resistor with the threshold value, and when the detected charge/discharge current is the threshold value or more, determines that an overcurrent state is detected and turns off the charge and discharge control FETs.

12 Claims, 6 Drawing Sheets

BATTERY PACK AND METHOD OF CONTROLLING THE SAME

CROSS REFERENCES TO RELATED APPLICATIONS

The present application contains subject matter related to that disclosed in Japanese Priority Patent Application JP 2009-004207 filed in the Japan Patent Office on Jan. 13, 2009, the entire contents of which is hereby incorporated by reference.

BACKGROUND

The present application relates to a battery pack for use in an electrically powered tool or the like, in which a load rush current flows, and a method of controlling a battery pack.

In recent years, as the power sources of various electronic apparatuses, a lithium-ion secondary battery which has advantages, such as high power, high energy density, compact, and lightweight, is widely used. The lithium-ion secondary battery has high energy density as compared with other secondary batteries using, for example, nickel-cadmium or nickel-hydride, so it is very important to ensure sufficient safety of the battery.

In a battery pack using a lithium-ion secondary battery, when an output is short-circuited for any reason, an internal part may be damaged due to overcurrent. While the charge/discharge cycle is repeated, the battery may be deteriorated due to overcharge or overdischarge, and heat may be abnormally generated. For this reason, a protection circuit or a protection IC (Integrated Circuit) is generally mounted in the battery pack so as to inhibit charge/discharge at the time of overcurrent, or overcharge or overdischarge.

In such a protection circuit, a predetermined threshold value is set in advance as an overcurrent detection current with respect to a charge/discharge current, when the value of the detected charge/discharge current exceeds the threshold value, it is determined to be an overcurrent, and charge/discharge is inhibited.

An existing battery pack is provided with, for example, a charge control FET (Field Effect Transistor) and a discharge control FET (hereinafter, appropriately referred to charge/discharge control FET). A charge/discharge current is detected on the basis of a potential difference between both ends of a source-drain resistor of the charge/discharge control FET. For example, JP-A-2000-67928 describes a technique in which a current is detected on the basis of a voltage drop due to the on resistance of the discharge control FET

SUMMARY

However, the resistance value of the charge/discharge control FET has variation, and the current value varies due to the increase in the resistance value when the gate voltage falls down. For this reason, detection accuracy may be degraded, making it difficult to accurately detect the charge/discharge current.

In recent years, in an apparatus, such as an electrically powered tool with a motor or the like, which should have high power, a product using a battery pack of a lithium-ion secondary battery as a power source comes into wide use. In general, in such an electrically powered tool, when the rotation speed of the motor at the time of activation or the like is low, a large current called a load rush current flows instantaneously, and a normal current flows after the rotation speed has increased.

In a method of detecting an overcurrent according to the related art, the load rush current flowing at the time of activation exceeds the threshold value, so the protection circuit may determine that the charge/discharge current is an overcurrent, and may inhibit charge/discharge.

When a large current of the load rush current flows, the charge/discharge control FET may be broken down. This is because the resistance value of the charge/discharge control FET is, for example, about several tens [mΩ], and a load rush current of about 100 [A] flows in the charge/discharge control FET, so power consumption in the charge/discharge control FET reaches several [W]. Further, power consumption in the resistor of the charge/discharge control FET is high, so a loss by the charge/discharge control FET increases.

In order to solve such a problem, for example, it is considered that an FET having high power resistance is used as the charge/discharge control FET in consideration of the magnitude of the load rush current. However, if an FET having high power resistance is used, costs may increase.

Thus, it is desirable to provide a battery pack capable of preventing erroneous detection of an overcurrent due to a load rush current and accurately detecting an overcurrent, and a method of controlling a battery pack.

One embodiment provides a battery pack for an electrically powered tool. The battery pack includes one or a plurality of secondary batteries connected in series and/or in parallel, a current detection resistor provided in a current path through which a charge/discharge current flows into each secondary battery, an N-channel charge control FET and an N-channel discharge control FET provided in the current path so as to control the charge/discharge current, and a controller detecting the charge/discharge current flowing in the current detection resistor and controlling the charge control FET and the discharge control FET on the basis of the detection result. A threshold value indicating an overcurrent detection current with respect to the charge/discharge current is set in advance. The controller compares the charge/discharge current detected by the current detection resistor with the threshold value, and when the detected charge/discharge current is equal to or larger than the threshold value, determines that an overcurrent state is detected and turns off the charge control FET and the discharge control FET.

Another embodiment provides a battery pack for an electrically powered tool. The battery back includes one or a plurality of secondary batteries connected in series and/or in parallel, a current detection resistor provided in a current path through which a charge/discharge current flows into each secondary battery, and a controller detecting the charge/discharge current flowing in the current detection resistor and outputting a control signal for a charge control FET and a discharge control FET, which are provided outside so as to control the charge/discharge current, on the basis of the detection result. A threshold value indicating an overcurrent detection current with respect to the charge/discharge current is set in advance. The controller compares the charge/discharge current detected by the current detection resistor with the threshold value, and when the detected charge/discharge current is equal to or larger than the threshold value, determines that an overcurrent state is detected and outputs the control signal.

A still another embodiment provides a method of controlling a battery pack. The method includes the steps of detecting a charge/discharge current flowing in one or a plurality of secondary batteries connected in series or in parallel by a current detection resistor provided in a current path through which the charge/discharge current flows, and comparing the detected charge/discharge current with a threshold value which indicates an overcurrent detection current set in advance with respect to the charge/discharge current, and when the detected charge/discharge current is equal to or larger than the threshold value, determining that an overcurrent state is detected and turning off an N-channel charge control FET and an N-channel discharge control FET which are provided in the current path so as to control the charge/discharge current.

A further another embodiment provides a method of controlling a battery pack. The method includes the steps of detecting a charge/discharge current flowing in one or a plurality of secondary batteries connected in series or in parallel by a current detection resistor provided in a current path through which the charge/discharge current flows, and comparing the detected charge/discharge current with a threshold value which indicates an overcurrent detection current set in advance with respect to the charge/discharge current, and when the detected charge/discharge current is equal to or larger than the threshold value, determining that an overcurrent state is detected and outputting a control signal for turning off a charge control FET and a discharge control FET, which are provided outside so as to control the charge/discharge current.

As described above, according to the one and still another embodiments, the charge/discharge current flowing in one or a plurality of secondary batteries connected in series or in parallel is detected by the current detection resistor provided in the current path through which the charge/discharge current flows. The detected charge/discharge current is compared with the threshold value which indicates the overcurrent detection current set in advance with respect to the charge/discharge current. When the detected charge/discharge current is equal to or larger than the threshold value, it is determined that the overcurrent state is detected, and the N-channel charge control FET and the N-channel discharge control FET which are provided in the current path so as to control the charge/discharge current are turned off. Therefore, an overcurrent can be detected with higher accuracy.

According to the another and further another embodiments, the charge/discharge current flowing in one or a plurality of secondary batteries connected in series or in parallel is detected by the current detection resistor provided in the current path through which the charge/discharge current flows. The detected charge/discharge current is compared with the threshold value which indicates the overcurrent detection current set in advance with respect to the charge/discharge current. When the detected charge/discharge current is equal to or larger than the threshold value, it is determined that the overcurrent state is detected, and the control signal for turning off the charge control FET and the discharge control FET which provided outside so as to control the charge/discharge current is output. Therefore, an overcurrent can be detected with higher accuracy.

According to the embodiments of the invention, the charge/discharge current flowing in each secondary battery is detected by the current detection resistor, the detected charge/discharge current is compared with the threshold value which indicates the overcurrent detection current set in advance with respect to the charge/discharge current, and when the detected charge/discharge current is equal to or larger than the threshold value, it is determined that the overcurrent state is detected. When it is determined that the overcurrent state is detected, control is performed such that the charge control FET and the discharge control FET provided in the battery pack, an external apparatus, or a charger are turned off. Therefore, an overcurrent can be detected with higher accuracy Additional features and advantages are described herein, and will be apparent from the following Detailed Description and the figures.

DETAILED DESCRIPTION

The present application will be described in detail below with reference to the drawings according to an embodiment. The description will be made in the following sequence.

1. First Embodiment (an example where a charge/discharge control FET is provided inside a battery pack)
2. Second Embodiment (an example where a charge/discharge control FET is provided outside a battery pack)

1. First Embodiment

A first embodiment will be described. In the first embodiment, a current detection resistor for detecting a charge/discharge current and a switch circuit for controlling the charge/discharge current are provided in a current path for a secondary battery. A delay time is set with respect to a time until the switch circuit is controlled to cut off the charge/discharge current after an excessive current is detected by the current detection resistor, and erroneous detection of an overcurrent due to a load rush current which is generated at the time of activation of a connected apparatus or the like is prevented.

[Configuration of Battery Pack]

Figure 1A:
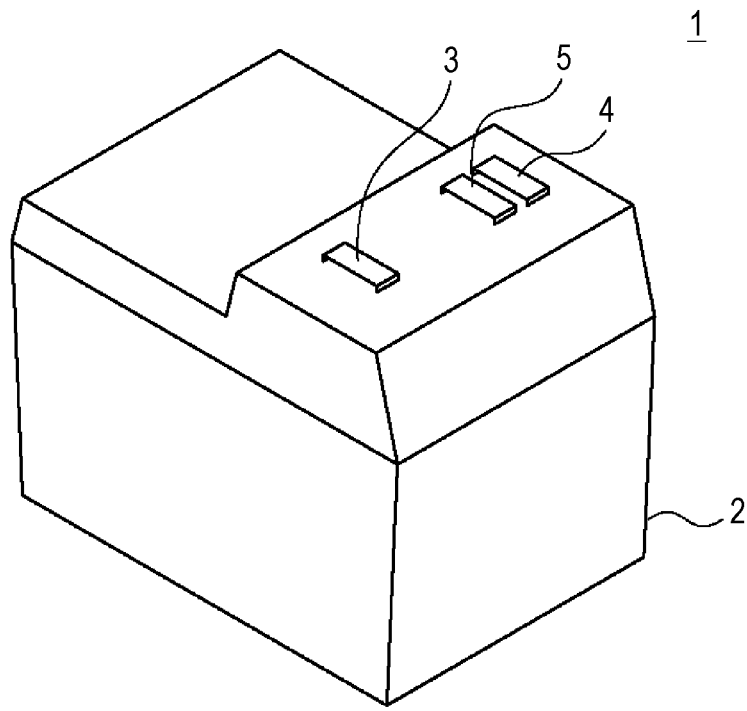
FIGS. 1A and 1B are schematic diagrams showing the appearance of an example of a battery pack which can be applied to a first embodiment.

FIG. 1A shows the appearance of an example of a battery pack 1 which can be applied to the first embodiment. The battery pack 1 has a housing 2 which is provided with various terminals, for example, a positive electrode terminal 3, a negative electrode terminal 4, a terminal 5 for controlling or performing communication with an apparatus main body or a charger connected thereto, and the like. When the battery pack 1 is mounted in the apparatus main body, power is supplied from a battery cell of a secondary battery provided inside the battery pack 1 to the apparatus main body. When the battery pack 1 is mounted on a charger, the battery cell is charged.

Figure 1B:
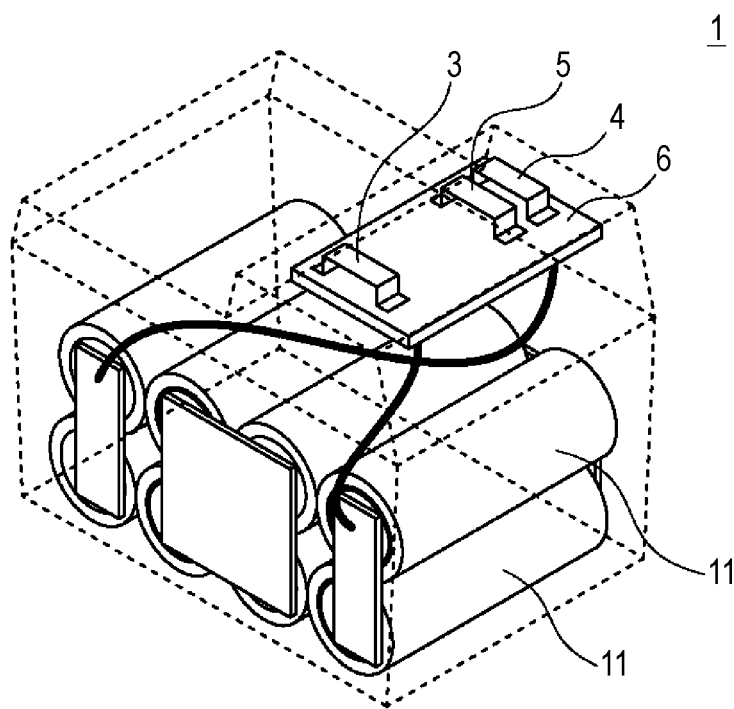

As shown in FIG. 1B, the battery pack 1 includes, inside the housing 2, a plurality of battery cells 11, 11, . . . of secondary batteries, and a circuit board 6. A plurality of battery cells 11, 11, . . . are arranged in parallel inside the housing 2 of the battery pack 1. The circuit board 6 is also arranged inside the housing 2. Electrode tabs are welded to the electrode terminals of a plurality of battery cells 11, 11, . . . , and a plurality of battery cells 11, 11, . . . are connected in series and/or in parallel. In this example, four sets of the parallel-connected paired battery cells are connected in series. One end of each wire rod is connected to the corresponding electrode tab, and the other end of the wire rod is connected to the circuit board 6. Thus, the battery cells 11, 11, . . . and the circuit board 6 are electrically connected to each other.

The circuit board 6 is provided with various terminals, such as the positive electrode terminal 3, the negative electrode terminal 4, the terminal 5, and the like. When the circuit board 6 is arranged in the housing 2, various terminals are exposed outside the housing 2. Although in this example, various terminals are arranged directly on the circuit board 6, the invention is not limited to this example. For example, various terminals may be arranged outside the housing 2 by using a connector.

Figure 2:
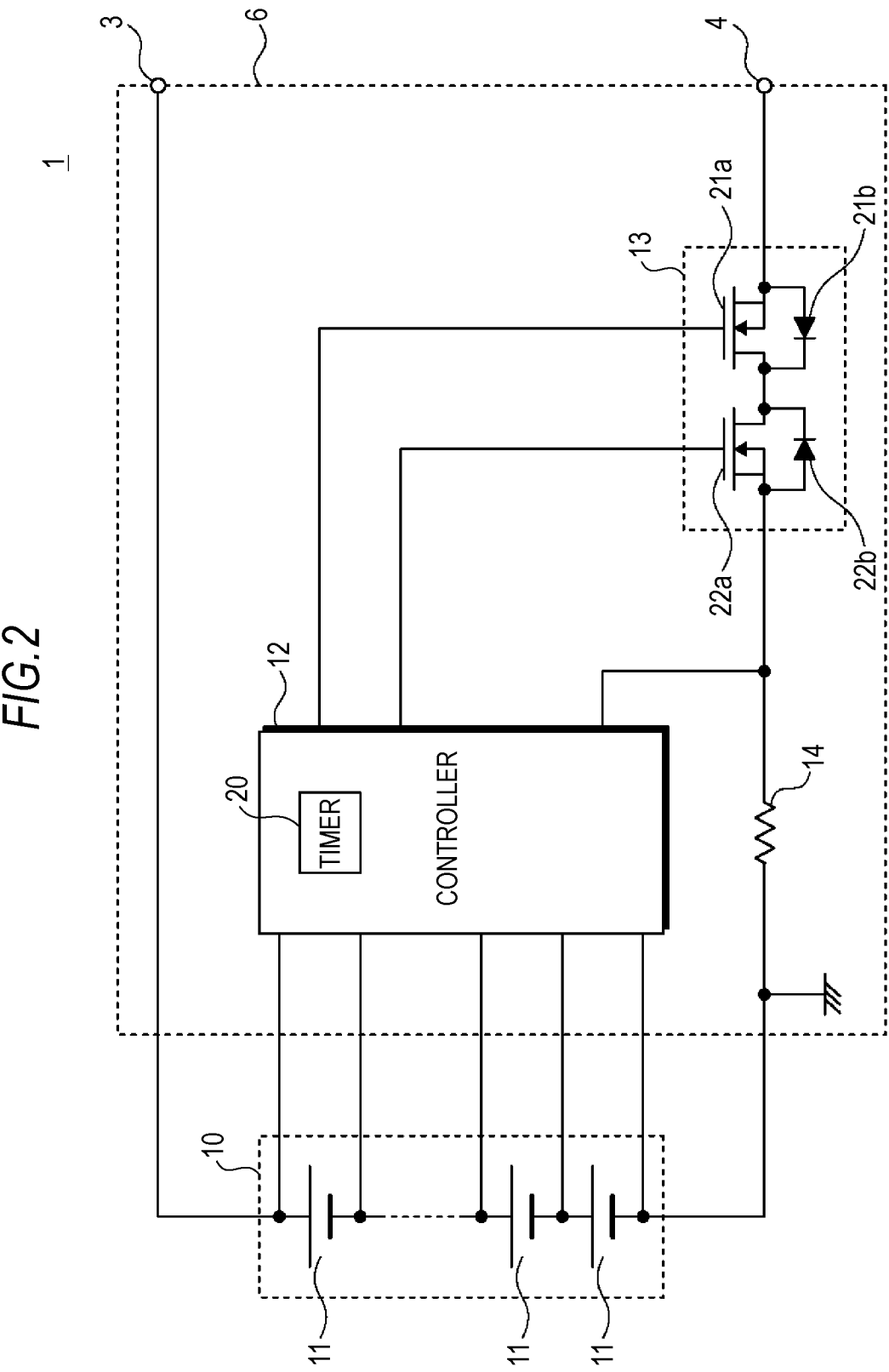
FIG. 2 is a block diagram showing the configuration of an example of the battery pack which can be applied to the first embodiment.

FIG. 2 shows the configuration of an example of the battery pack 1 which can be applied to the first embodiment. In this example, for simplification of description, only portions related to the embodiment of the invention will be shown and described. The battery pack 1 includes an assembled battery 10 having a plurality of battery cells 11, 11, . . . , and a circuit board 6 on which a controller 12, a switch circuit 13, a current detection resistor 14, a positive electrode terminal 3, and a negative electrode terminal 4 are mounted.

When the apparatus is used, the positive electrode terminal 3 and the negative electrode terminal 4 of the battery pack 1 are respectively connected to a positive electrode terminal and a negative electrode terminal of the external apparatus main body, and discharge is performed. At the time of charge, the battery pack 1 is mounted on a charger, as when the apparatus is used, the positive electrode terminal 3 and the negative electrode terminal 4 are respectively connected to the positive electrode terminal and the negative electrode terminal, and charge is performed.

The assembled battery 10 has a plurality of battery cells 11, 11, . . . connected in series and/or in parallel. Each battery cell 11 is, for example, is a secondary battery which is a cylindrical type lithium-ion secondary battery. In this example, a plurality of battery cells 11, 11, . . . are connected in series.

The controller 12 includes, for example, an IC (Integrated Circuit). The controller 12 measures a charge/discharge current from a potential difference between both ends of a current detection resistor 14 provided in a current path, and detects an overcurrent on the basis of the measurement result. The controller 12 measures a voltage of each battery cell 11, and detects overcharge or overdischarge on the basis of the measurement result. Then, the controller 12 outputs a control signal for controlling the switch circuit 13 described below on the basis of the detection result of an overcurrent, or overcharge or overdischarge. The controller 12 is provided with a timer 20. The timer 20 starts counting when an excessive current is detected, and measures a time for which the excessive current flows.

The switch circuit 13 includes a charge control FET (Field Effect Transistor) 21a and a discharge control FET 22a, and is provided on the negative electrode terminal 4 side. The charge control FET 21a and the discharge control FET 22a are, for example, N-channel FETs.

When an overcurrent is detected at the time of charge, control is performed such that the charge control FET 21a is turned off on the basis of the control signal from the controller 12, and a charge current does not flow. When an overcurrent is detected at the time of discharge, control is performed such that the discharge control FET 22a is turned off on the basis of the control signal from the controller 12, and a discharge current does not flow.

When the battery voltage reaches an overcharge detection voltage, control is performed such that the charge control FET 21a is turned off on the basis of the control signal from the controller 12, and a charge current does not flow. After the charge control FET 21a is turned off, only discharge is possible through a parasitic diode 21b. When the battery voltage reaches an overdischarge detection voltage, control is performed such that the discharge control FET 22a is turned off on the basis of the control signal from the controller 12, and a discharge current does not flow. After the discharge control FET 22a is turned off, only charge is possible through a parasitic diode 22b.

Although in this example, the switch circuit 13 using N-channel FETs are provided on the negative electrode terminal 4 side, the invention is not limited to this example. For example, the switch circuit 13 using P-channel FETs may be provided on the positive electrode terminal 3 side. However, P-channel FETs have high drain-source resistance and are expensive, as compared with N-channel FETs. In terms of this situation, N-channel FETs are preferably used.

[Erroneous Detection Prevention of Overcurrent Due to Load Rush Current]

Figure 3A:
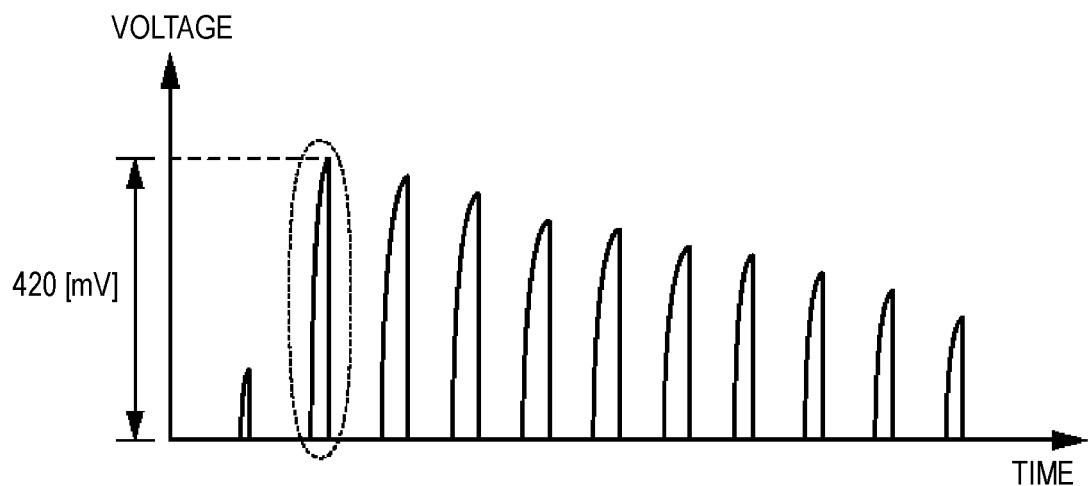
FIGS. 3A and 3B are schematic diagrams illustrating a load rush current which is generated when an electrically powered tool is activated.
Figure 3B:
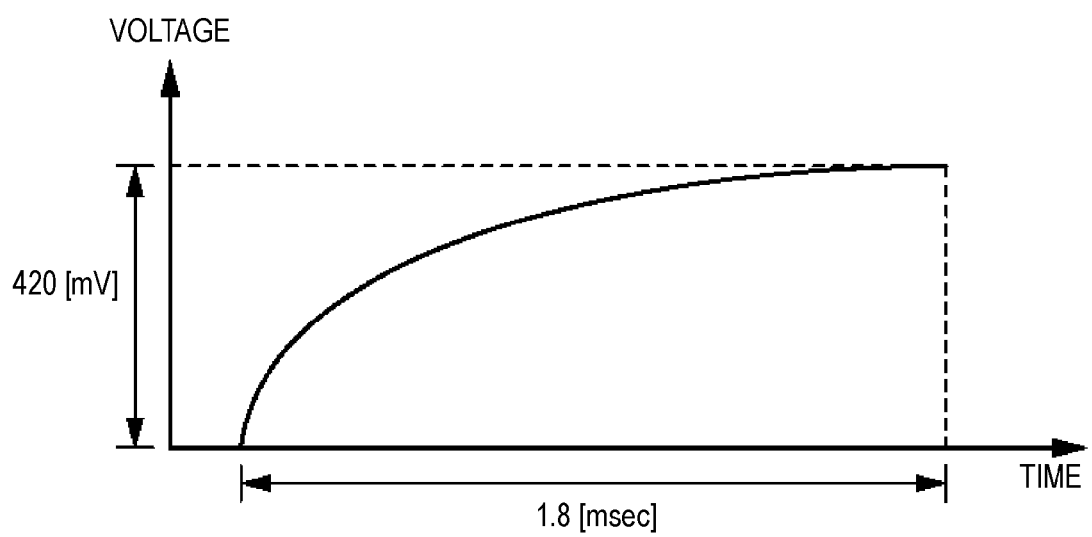

Next, a method of preventing erroneous detection of an overcurrent will be described. As described in the background art, in an electrically powered tool using a motor, a load rush current flows at the time of activation or the like. FIG. 3A shows an example of a waveform of a potential difference between both ends of the current detection resistor 14 when the electrically powered tool having the battery pack 1 mounted therein is activated. FIG. 3B shows an example where a portion surrounded by a dotted line in FIG. 3A is enlarged in a time direction.

When the electrically powered tool is activated, as shown in FIG. 3A, a potential difference between both ends of the current detection resistor 14 is generated instantaneously and successively. At this time, the maximum peak voltage reaches about 420 [mV]. This potential difference is put in a normal state and has a usual voltage value after a predetermined time elapses as the peak voltage gradually decreases.

In this case, the peak value of the flowing load rush current can be calculated by Expression (1) when the current detection resistor 14 having resistance of 5 [mΩ] is used.

$$420[mV]/5[m\Omega]=84[A] \tag{1}$$

As described above, at the time of activation of the electrically powered tool or the like, a current of about 80 [A] which significantly exceeds an overcurrent detection current flows instantaneously. For this reason, in an overcurrent detection process according to the related art, the load rush current may be erroneously detected as an overcurrent due to abnormality.

Accordingly, in the first embodiment, when an excessive current is detected, a predetermined delay time is set with respect to the time for which the charge/discharge current flows, such that the load rush current is not erroneously detected as an overcurrent. Then, it is determined whether the excessive current is an overcurrent or not according to whether or not the detected excessive current only flows within the set delay time.

The delay time is set as a threshold value in the timer 20 which is provided in the controller 12. When an excessive current is detected, the timer 20 is activated to count the time for which the excessive current flows. For example, when the excessive current continues to flow even though the delay time has elapsed, it can be determined that the excessive current is an overcurrent due to abnormality. When the excessive current is within the set delay time, it can be determined that the excessive current is not an overcurrent. That is, if the excessive current only flows within the set delay time and has then a substantially usual current value, it can be determined that the excessive current is a temporary excessive current, such as a load rush current or the like.

As described above, overcurrent determination is not made until the delay time elapses after the excessive current is detected. In this way, it is possible to prevent the load rush current from being erroneously detected as an overcurrent due to abnormality.

As shown in FIG. 3B, the time at which the potential difference is generated instantaneously is about 1.8 [msec]. The state where the potential difference is generated instantaneously is generated multiple times until the normal state is reached. Accordingly, the delay time is set in consideration of the time for which the load rush current flows due to the potential difference. Specifically, in terms of a margin or the like, the delay time is preferably set to be in a range of about 20 [msec] to 100 [msec].

[Overcurrent Detection Process]

Figure 4:
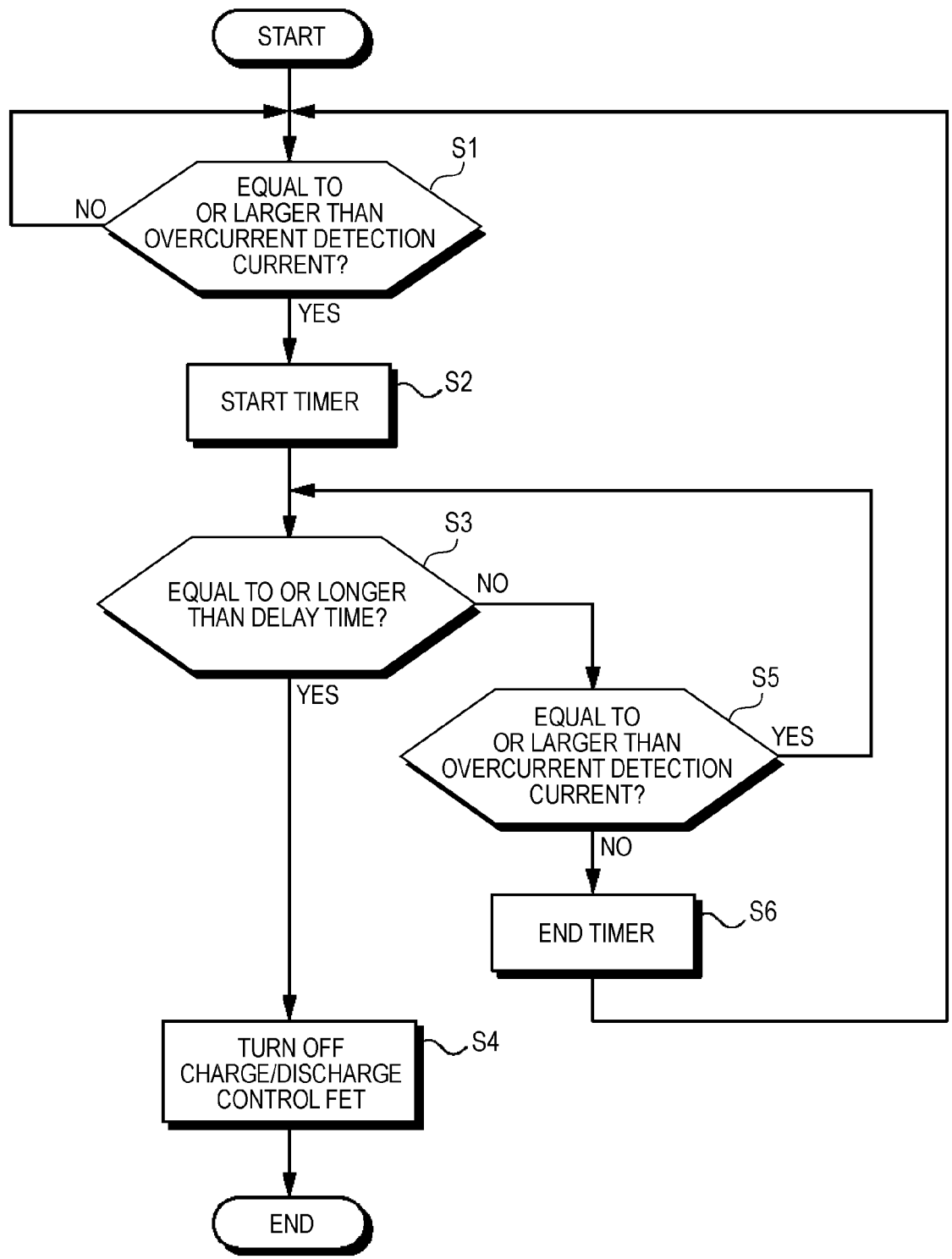
FIG. 4 is a flowchart illustrating a flow of an overcurrent detection process according to the first embodiment.

A flow of the overcurrent detection process in a secondary battery 2 which can be applied to an embodiment will be described with reference to a flowchart shown in FIG. 4. It is assumed that the following process is performed under the control of the controller 12 insofar as it is not particularly described. It is also assumed that the following process is performed cyclically for every predetermined time.

First, in Step S1, a charge/discharge current flowing in the current detection resistor 14 is detected. With regard to the charge/discharge current, an overcurrent detection current is set in advance as a threshold value, and it is determined whether or not the detected charge/discharge current is equal to or larger than the set overcurrent detection current. When the detected charge/discharge current is smaller than the overcurrent detection current, it is determined that a normal charge/discharge current flows, and Step S1 is performed cyclically for every predetermined time. When the detected charge/discharge current is equal to or larger than the overcurrent detection current, it is determined that an excessive current flows, and in Step S2, the timer 20 is activated so as to count the time for which the current flows.

Next, in Step S3, it is determined whether or not the time counted by the timer 20 is equal to or longer than the delay time set in advance. When it is determined that the counted time is equal to or longer than the delay time, the process progresses to Step S4. That is, in this case, an excessive current flows even though the delay time set in the timer 20 is reached, so it is determined that an overcurrent flows. In Step S4, the charge control FET 21a and the discharge control FET 22a provided in the switch circuit 13 are turned off so as to inhibit charge/discharge, and a series of processes ends.

In Step S3, when it is determined that the counted time is shorter than the delay time, in Step S5, it is determined whether or not the charge/discharge current flowing in the current detection resistor 14 is equal to or larger than the overcurrent detection current. When it is determined that the charge/discharge current is equal to or larger than the overcurrent detection current, the process returns to Step S3.

When it is determined that the charge/discharge current is smaller than the overcurrent detection current, the process progresses to Step S6, and time measurement by the timer 20 ends. That is, in this case, an excessive current stops to flow before the delay time set in the timer 20 is reached, so it is determined that the detected excessive current is a load rush current, not an overcurrent. Then, the process returns to Step S1, and the charge/discharge current is detected cyclically for every predetermined time.

[Release of Charge/Discharge Inhibition State]

Next, release of a charge/discharge inhibition state will be described. In the battery pack 1, when it is determined that an overcurrent flows, the charge control FET 21a and the discharge control FET 22a are turned off so as to inhibit charge/discharge; however, when the overcurrent stops to flow, the charge/discharge inhibition state should be released. The first embodiment of the invention is configured such that the charge/discharge inhibition state is released on the basis of the potential difference between both ends of the current detection resistor 14.

Figure 5A:
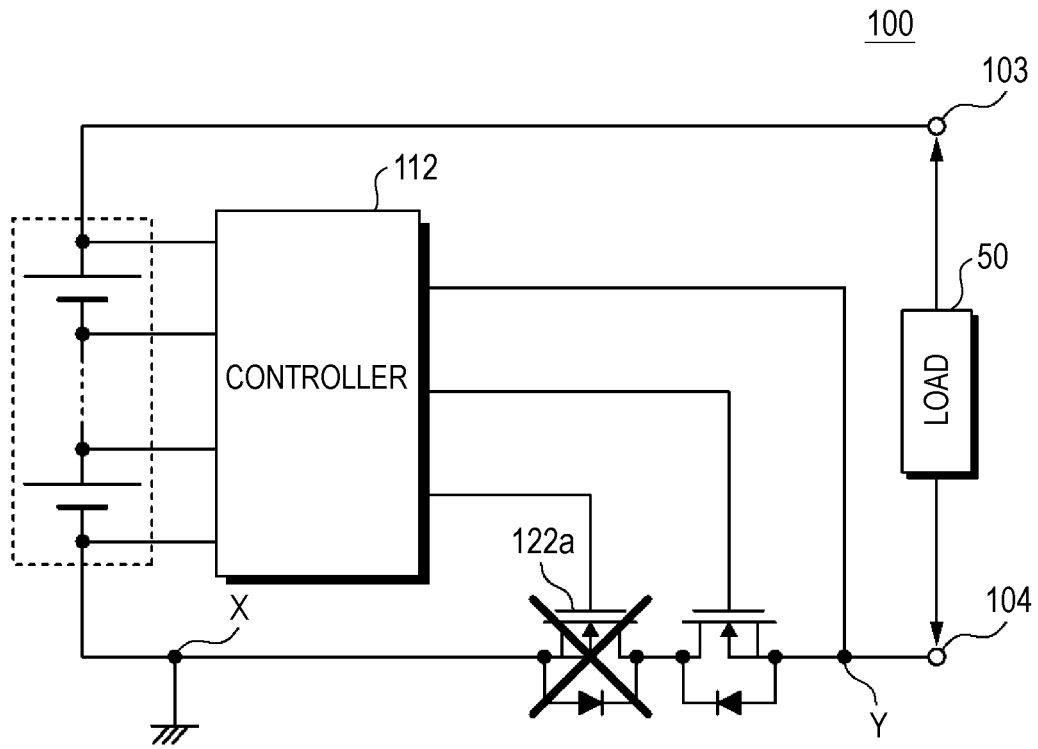
FIGS. 5A and 5B are schematic diagrams illustrating a method of releasing a charge/discharge inhibition state.
Figure 5B:
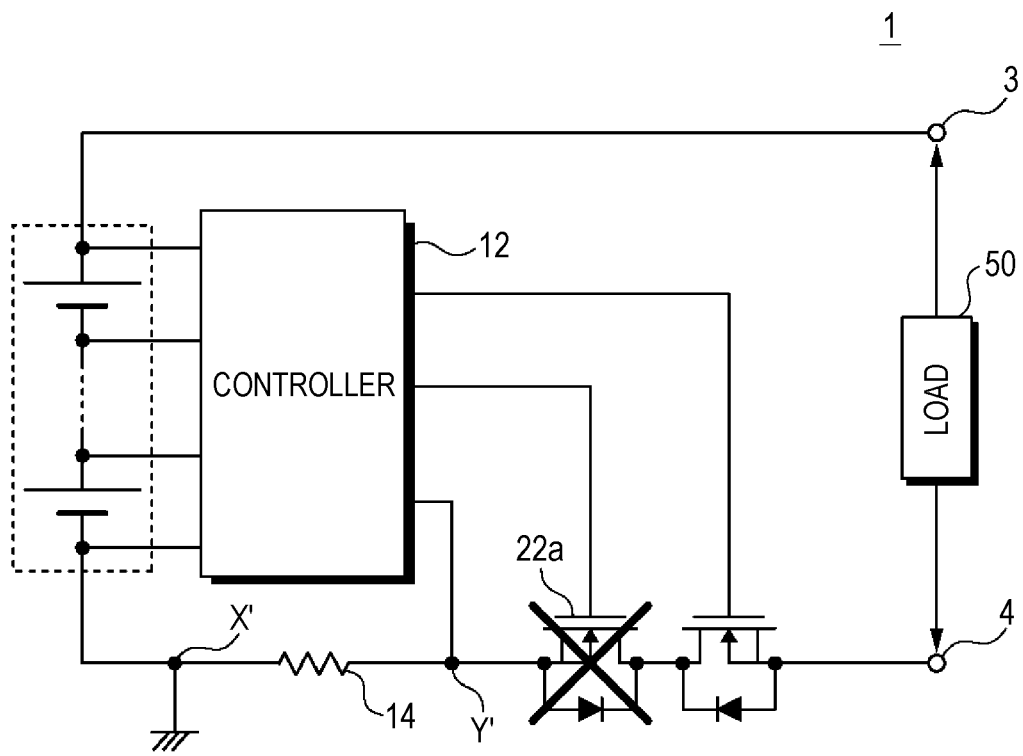

For example, as shown in FIGS. 5A and 5B, a case will be discussed where a load, such as an electrically powered tool or the like is connected to the battery pack, and an overcurrent flows due to abnormality in the load at the time of discharge. First, for ease of understanding of release of the charge/discharge inhibition state according to the first embodiment of the invention, a case where a load is connected to an existing battery pack 100 will be described. FIG. 5A shows an example when a load is connected to the existing battery pack 100.

As shown in FIG. 5A, the existing battery pack 100 is not provided with a current detection resistor, so current detection is performed by drain-source resistance in the discharge control FET 122a. That is, in the existing battery pack 100, voltages are measured at a point X and a point Y, and it is determined on the basis of a potential difference between the two points whether or not an overcurrent flows.

In the existing battery pack 100, if an overcurrent flows due to abnormality in a load 50, control is performed so as to turn off the discharge control FET 122a. At this time, if the discharge control FET 122a is turned off, an overcurrent is shut off. However, even though an overcurrent is shut off, since a negative electrode terminal 104 is connected to a positive electrode terminal 103 through the load 50, the point Y is pulled up to the + side, and a potential difference is generated between the point X and the point Y. For this reason, in the existing battery pack 100, even though a normal current flows, it is determined that an overcurrent flows due to a potential difference between the point X and the point Y, which makes it difficult to release the charge/discharge inhibition state.

FIG. 5B shows an example where a load is connected to the battery pack 1 according to the first embodiment of the invention. As shown in FIG. 5B, in the battery pack 1 according to the first embodiment, if an overcurrent is detected due to abnormality in the load 50, control is performed so as to turn off the discharge control FET 22a according to the flowchart shown in FIG. 4.

At this time, if the discharge control FET 22a is turned off, the overcurrent is shut off, and no potential difference is generated between both ends of the current detection resistor 14 indicated by points X' and Y'. Therefore, the controller 12 can determine that no overcurrent flows and turns on the discharge control FET 22a so as to release the discharge inhibition state.

As described above, the charge/discharge current is detected on the basis of the potential difference between both ends of the current detection resistor, and when no potential difference is generated, it is determined that a normal current flows. Therefore, the charge/discharge inhibition state can be released.

2. Second Embodiment

A second embodiment will be described. The second embodiment of the invention is different from the first embodiment in that the charge control FET and the discharge control FET are provided in the external apparatus and/or the charger, and the battery pack controls the charge/discharge control FET.

[Configuration of Battery Pack]

Figure 6:
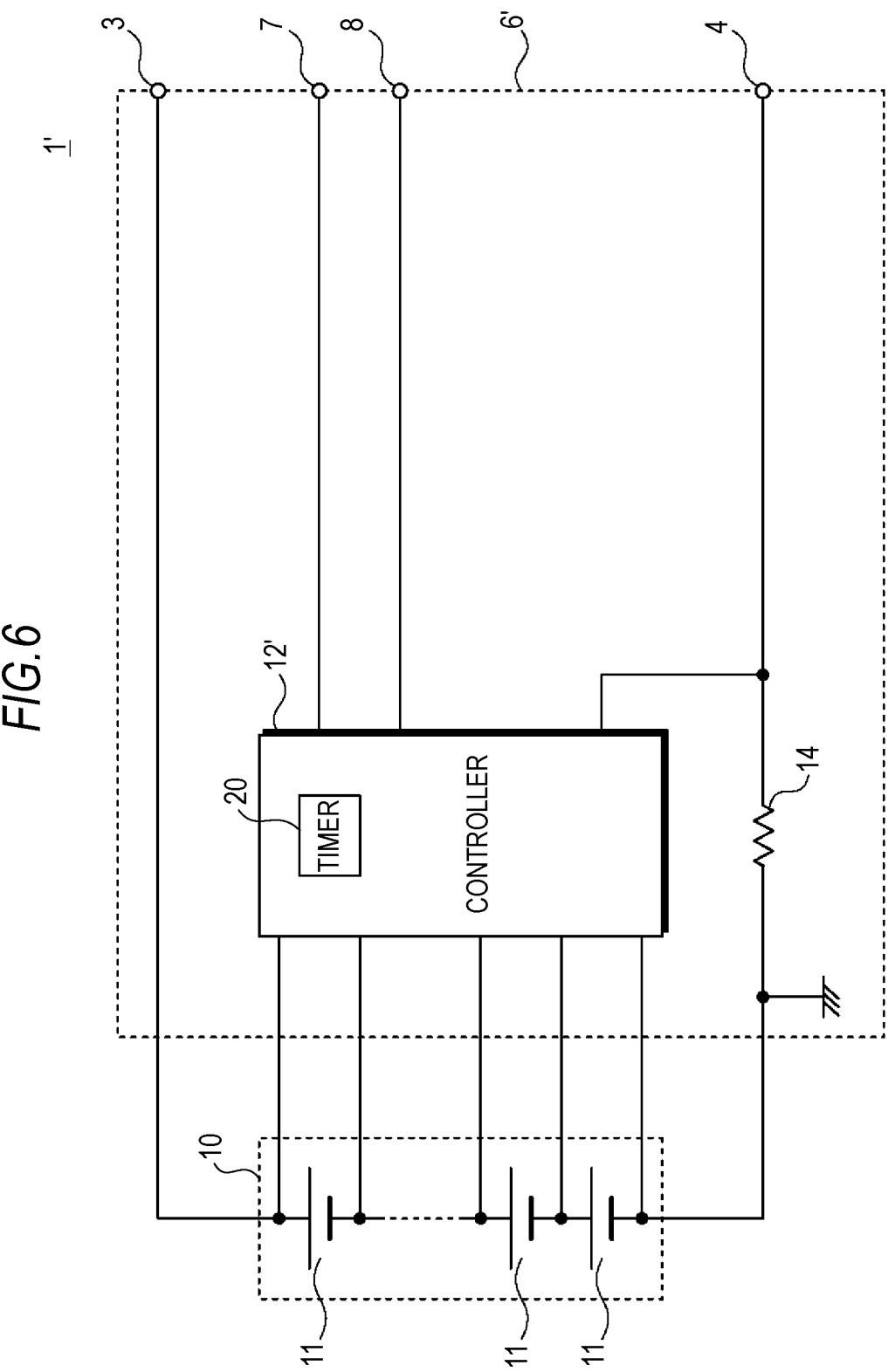
FIG. 6 is a block diagram showing the configuration of an example of a battery pack which can be applied to a second embodiment.

FIG. 6 shows the configuration of an example of a battery pack 1' which can be applied to a second embodiment of the invention. The same parts as those in the above-described first embodiment are represented by the same reference numerals, and detailed descriptions thereof will not be repeated. The battery pack 1' includes an assembled battery 10 having a plurality of battery cells 11, 11, . . . , and a circuit board 6' on which a controller 12', a current detection resistor 14, a positive electrode terminal 3, a negative electrode terminal 4, a charge control terminal 7, and a discharge control terminal 8 are mounted.

When the battery pack 1' is connected to the apparatus main body and/or the charger, the positive electrode terminal 3 and the negative electrode terminal 4 are respectively connected to the positive electrode terminal and the negative electrode terminal of the external apparatus main body and/or the charger. The charge control terminal 7 and the discharge control terminal 8 are respectively connected to a charge control terminal and a discharge control terminal of the external apparatus main body and/or the charger.

Similarly to the first embodiment, the controller 12' includes, for example, an IC (Integrated Circuit). The controller 12' measures a charge/discharge current from a potential difference between both ends of a current detection resistor 14 provided in a current path, and detects an overcurrent on the basis of the measurement result. On the basis of the detection result of the overcurrent, a charge control signal for controlling a charge control FET provided in the external apparatus main body and/or the charger is output through the charge control terminal 7. A discharge control signal for controlling a discharge control FET is output through a discharge control terminal 8.

The charge control FET and the discharge control FET provided in the external apparatus main body and/or the charger are controlled on the basis of the charge control signal and the discharge control signal supplied from the battery pack 1'.

[Erroneous Detection Prevention of Overcurrent Due to Load Rush Current]

Next, a method of preventing erroneous detection of an overcurrent will be described. In the second embodiment, similarly to the above-described first embodiment, when an excessive current is detected, it is determined whether the excessive current is an overcurrent or not according to whether or not the detected excessive current only flows within the delay time set in the timer 20.

For example, when an excessive current continues to flows even though the delay time has elapsed, it can be determined that the excessive current is an overcurrent due to abnormality. When it is determined that the excessive current is an overcurrent, the charge control signal and the discharge control signal are output from the controller 12' through the charge control terminal 7 and the discharge control terminal 8 and supplied to the connected apparatus main body and/or the charger. When the excessive current only flows within the set delay time, it can be determined that the excessive current is not an overcurrent.

The apparatus main body and/or the charger which receives the charge control signal and the discharge control signal turns off the charge/discharge control FET provided therein on the basis of the control signals so as to inhibit charge/discharge.

As described above, in the first and second embodiments of the invention, charge/discharge control is not performed on the basis of an excessive current generated within a set delay time after the excessive current is detected. Therefore, it is possible to prevent erroneous detection due to an excessive current, such as a load rush current or the like, which instantaneously flows.

Although the first and second embodiments have been described, the invention is not limited to the above-described first and second embodiments of the invention, and various modifications or applications may be made without departing from the subject matter of the present application. Although in this example, a cylindrical type is used as a battery cell, the present application is not limited thereto. For example, the present application may be applied to a rectangular type battery cell.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A battery pack comprising:
   one or a plurality of secondary batteries;
   a current detection resistor provided in a current path through which a current flows into each secondary battery;
   a control FET provided in the current path so as to control the current; and
   a controller detecting the current flowing in the current detection resistor and controlling the control FET on the basis of the detection result,
   wherein
      the controller compares the current detected by the current detection resistor with a threshold value indicating an overcurrent detection current with respect to the current, and when the detected current is equal to or larger than the threshold value, determines that an overcurrent state is detected,
   the controller includes a timer which counts the time of the overcurrent state and has a delay time set with respect to the counted time such that when the overcurrent state is detected, the controller activates the timer to start to count the time of the overcurrent state, and performs control such that the control FET is not turned off until the counted time reaches the delay time,
   even though the time counted by the timer exceeds the delay time, when the current is equal to or larger than the threshold value, the controller performs control such that the control FET is turned off,
   before the time counted by the timer reaches the delay time, when the current becomes smaller than the threshold value, the controller ends time counting by the timer and performs control such that the control FET is not turned off, and
   after the control FET is turned off, the controller measures a potential difference between each end of the current detection resistor and if the controller determines that there is no potential difference, the controller turns on the control FET.

2. The battery pack according to claim 1,
   wherein the control FET includes a charge control FET and a discharge control FET are provided on a negative electrode side of each secondary battery.

3. The battery pack according to claim 1, wherein the current detection resistor is connected in series between the control FET and the secondary battery.

4. The battery pack according to claim 3, wherein each end of the current detection resistor is connected to the controller.

5. The battery pack according to claim 1, wherein the controller is configured to detect a potential difference resulting from both a discharge current and a charging current flowing through the current detection resistor.

6. A battery pack comprising: one or a plurality of secondary batteries;
   a current detection resistor provided in a current path through which a current flows into each secondary battery; and
   a controller detecting the current flowing in the current detection resistor and outputting a control signal for a control FET, which is provided outside so as to control the current, on the basis of the detection result,
   wherein a threshold value indicating an overcurrent detection current with respect to the current is set in advance,
   the controller compares the current detected by the current detection resistor with the threshold value, and when the detected current is equal to or larger than the threshold value, determines that an overcurrent state is detected and outputs the control signal,
   the controller includes a timer which counts the time of the overcurrent state and has a delay time set with respect to the counted time such that when the overcurrent state is detected, the controller activates the timer to start to count the time of the overcurrent state, and performs control such that the control FET is not turned off until the counted time reaches the delay time,
   even though the time counted by the timer exceeds the delay time, when the current is equal to or larger than the threshold value, the controller performs control such that the control FET is turned off,
   before the time counted by the timer reaches the delay time, when the current becomes smaller than the threshold value, the controller ends time counting by the timer and performs control such that the control FET is not turned off, and
   after the control FET is turned off, the controller measures a potential difference between each end of the current detection resistor and if the controller determines that there is no potential difference, the controller turns on the control FET.

7. A method of controlling a battery pack, the method comprising:
   detecting a current flowing in one or a plurality of secondary batteries by a current detection resistor provided in a current path through which the current flows;
   comparing the detected current with a threshold value which indicates an overcurrent detection current set in advance with respect to the current, and when the detected current is equal to or larger than the threshold value, determining that an overcurrent state is detected and controlling a control FET which is provided in the current path so as to control the current;
   counting the time of the overcurrent state with a timer that includes a delay time set with respect to the counted time;
   performing control such that the control FET is not turned off until the counted time reaches the delay time when the overcurrent state is detected and activating the timer to start to count the time of the overcurrent state;
   performing control such that the control FET is turned off, even though the time counted by the timer exceeds the delay time, when the current is equal to or larger than the threshold value;
   ending counting by the timer and performing control such that the control FET is not turned off before the time counted by the timer reaches the delay time, when the current becomes smaller than the threshold value; and
   after the control FET is turned off, measuring a potential difference between each end of the current detection resistor and if there is no potential difference, turning on the control FET.

8. A method of controlling a battery pack, the method comprising:
   detecting a current flowing in one or a plurality of secondary batteries by a current detection resistor provided in a current path through which the current flows; and
   comparing the detected current with a threshold value which indicates an overcurrent detection current set in advance with respect to the current, and when the detected current is equal to or larger than the threshold value, determining that an overcurrent state is detected and outputting a control signal for turning off a control FET, which is provided outside so as to control the current;
   counting the time of the overcurrent state with a timer that includes a delay time set with respect to the counted time;
   performing control such that the control FET is not turned off until the counted time reaches the delay time when the overcurrent state is detected and activating the timer to start to count the time of the overcurrent state;
   performing control such that the control FET is turned off, even though the time counted by the timer exceeds the delay time, when the current is equal to or larger than the threshold value;
   ending counting by the timer and performing control such that the control FET is not turned off before the time counted by the timer reaches the delay time, when the current becomes smaller than the threshold value; and
   after the control FET is turned off, measuring a potential difference between each end of the current detection resistor and if there is no potential difference, turning on the control FET.

9. A control integrated circuit configured to:
   detect a current flowing in one or a plurality of secondary batteries by a current detection resistor provided in a current path through which the current flows; and
   compare the detected current with a threshold value which indicates an overcurrent detection current set in advance with respect to the current, and when the detected current is equal to or larger than the threshold value, determining that an overcurrent state is detected and outputting a control signal for turning off a control FET, which is provided outside so as to control the current;
   count the time of the overcurrent state with a timer that includes a delay time set with respect to the counted time;
   perform control such that the control FET is not turned off until the counted time reaches the delay time when the overcurrent state is detected and activating the timer to start to count the time of the overcurrent state;

perform control such that the control FET is turned off, even though the time counted by the timer exceeds the delay time, when the current is equal to or larger than the threshold value;

end counting by the timer and performing control such that the control FET is not turned off before the time counted by the timer reaches the delay time, when the current becomes smaller than the threshold value; and after the control FET is turned off, measure a potential difference across each end of the current detection resistor and if there is no potential difference, turning on the control FET.

10. A charging apparatus for a battery comprising: a current detection resistor provided in a current path through which a current flows into one or a plurality of secondary batteries, the secondary batteries electrically connectable to the charging apparatus;

a controller detecting the current flowing in the current detection resistor and outputting a control signal for a control FET, which is provided so as to control the current, on the basis of the detection result; wherein the controller compares the current detected by the current detection resistor with a threshold value, and when the detected current is equal to or larger than the threshold value, determines that an overcurrent state is detected and turns off the control FET, the controller includes a timer which counts the time of the overcurrent state and has a delay time set with respect to the counted time such that when the overcurrent state is detected, the controller activates the timer to start to count the time of the overcurrent state, and performs control such that the control FET is not turned off until the counted time reaches the delay time, even though the time counted by the timer exceeds the delay time, when the current is equal to or larger than the threshold value, the controller performs control such that the control FET is turned off, before the time counted by the timer reaches the delay time, when the current becomes smaller than the threshold value, the controller ends time counting by the timer and performs control such that the control FET is not turned off, and after the control FET is turned off, the controller measures a potential difference across each end of the current detection resistor and if the controller determines that there is no potential difference, the controller determines that a normal current is flowing and that a state is released by turning on the control FET.

11. The charging apparatus according to claim 10, wherein the current detection resistor is connected in series between the control FET and the secondary battery.

12. The charging apparatus according to claim 11, wherein each end of the current detection resistor is connected to the controller.

* * * * *